United States Patent Office 3,759,793
Patented Sept. 18, 1973

3,759,793
PROCESS FOR THE QUANTITATIVE DETERMINATION OF TRI-, DI- AND MONOGLYCERIDES
Harald Stork, Lampertheim, Hessen, and Felix Helmut Schmidt, Mannheim-Seckenheim, Germany, assignors to Boehringer Mannheim GmbH, Mannheim, Germany
No Drawing. Filed Dec. 21, 1970, Ser. No. 100,498
Claims priority, application Germany, Jan. 2, 1970,
P 20 00 127.8
Int. Cl. C12k 1/04
U.S. Cl. 195—103.5 R                        11 Claims

ABSTRACT OF THE DISCLOSURE

Lipoproteins and/or protein free neutral fats present in body fluids, i.e., tri-, di- and monoglycerides, are determined completely enzymatically by using the lipase obtained from *Rhizopus arrhizus* to split the glyceride to be determined, and then in known fashion converting the resulting glyceride to pyruvate, and converting the pyruvate to lactic acid with NADH, the photometrically determined amount of NADH used up being a measure of the initial glyceride content.

---

The present invention is concerned with a process for the quantitative fission of triglycerides, which are present in body fluids as lipoproteins, and is also concerned with a process for the quantitative determination of protein-free tri-, di- and monoglycerides. Furthermore, the present invention is concerned with a storage-stable test combination for the quantitative, rapid determination of tri-, di- and monoglycerides.

The quantitative determination of triglycerides, especially of those which are bound to lipoproteins, plays an increasingly important part in the investigation of arterioscleroses, as well as in routine clinical and pharmacological investigations.

The processes for this purpose which have been known for a long time all suffer from various technical disadvantages during the carrying out thereof and, in addition, often only have a low specificity and analytical precision. The enzymatic determination of triglycerides has, because of its relatively good specificity and accuracy, become generally used in recent years (cf. Klin. Wochenschr., 40, 362/1962; Klin. Chemie, 6, 156–159/1968).

In processes which have hitherto been used, the fat is first split with a strong base, for example, with an alcoholic solution of potassium hydroxide, into the salts of the fatty acids and into glycerol, whereupon the glycerol contained in the liquid, after separation of the fatty acid components, for example, by precipitation and subsequent centrifuging, is enzymatically converted in known manner into pyruvate. The amount of pyruvate equivalent to the original glycerol content is subsequently converted, with the use of NADH (the reduced form of nicotinamide-adenine-dinucleotide or of diphosphopyridine-nucleotide) and lactate-dehydrogenase, into lactic acid, the photometrically measurable decrease of the NADH being a direct measure of the glycerol content.

In spite of the otherwise considerable advance in the methodology, the saponification of the fat is still a time consuming and laborious process because it can only be achieved quantitatively by the action of a warm ethanolic potassium hydroxide solution for a period of half an hour. Furthermore, it is necessary to precipitate out the resultant potassium salts of the fatty acids, in an additional step, as the magnesium salts by the addition of magnesium sulphate and to remove the resultant precipitate, for example, by centrifuging off. Attempts also to carry out the first stage of the fat fission enzymatically have hitherto been unsuccessful for three main reasons:

(1) Lipoprotein-bound triglycerides can admittedly be split by lipoprotein lipases. However, these can only be obtained from human or animal tissues, they are not very stable and they contain such a high protein content that the photometric determination of the NADH is impaired. In addition, the fission does not take place completely, even when using long incubation times.

(2) Emulsified neutral fats are split stepwise, by lipases which originate from the pancreas, via the di- and monoglycerides to give the free fatty acids and glycerol but, in some cases, the fission only goes as far as the monoglycerides. However, the method of determination with which the present invention is concerned can only be carried out when the fission takes place quantitatively to the free glycerol stage. For practical reasons, a quantitative determination cannot be carried out with very large amounts of enzymes and long incubation times, even though they sometimes bring about a complete fission of the fats.

(3) Simple protein-free triglycerides are split by a series of "foreign" lipases obtained from plants or fungi. The fission of lipoproteins, i.e. protein-bound fats, takes place, if at all, only incompletely or requires such large amounts of enzymes (more than 5 mg. in about 2 ml. solution) that an optical determination is no longer possible because of the turbidity brought about by the reagent.

We have now found, surprisingly, that the lipase from *Rhizopus arrhizus* (described in Comptes Rendus Acad. Sci. Paris, 259, 4394–4396/1964) is able quantitatively to split lipoprotein-bound triglycerides, in addition to the triglycerides contained in chylomicrons, with an extraordinarly high degree of conversion value, into free fatty acids and glycerol, without the subsequent optical determination of NADH in ultraviolet light being impaired. What makes this result all the more surprising is the fact that hitherto no "foreign" lipases were known which had a sufficient degree of activity towards the lipoprotein-bound triglycerides; thus, the art taught against the use of any foreign lipase for the quantitative determination of such substance, and it was most surprising that the specific lipase used in this invention is operative.

Accordingly, the process of the present invention comprises, essentially, the use of *Rhizopus arrhizus* lipase to saponify the glyceride to be determined, converting the resulting glycerol to pyruvate, and subsequently converting the pyruvate to lactic acid with NADH, the photometrically determinable amount of NADH used up being a direct measure of the glycerol and thus, of the initial glyceride, content. Thus, the process according to the present invention provides for the fully enzymatic and quantitative determination of triglycerides, which are bound to lipoproteins, and/or of protein-free neutral fats in solution, especially in body fluids, by spliting of the lipoproteins and neutral fats with a lipase obtained from *Rhizopus arrhizus* and the glycerol obtained as fission product is determined enzymatically in per se known manner.

The present invention makes it now possible to carry out the determination of protein-free neutral fats and of protein-bound triglycerides, without previous alkaline saponification at an elevated temperature and working up of the sample, completely enzymatically and without sacrificing the accuracy of the determination. Apart from the avoidance of strongly corrosive alkalis, which are unpleasant to handle, the process according to the present invention also results, in particular, in a considerable saving of time.

Furthermore, the enzymatic saponification of fat has the advantage of considerably reducing the amount of serum needed, in comparison with the previously known methods, i.e. to about one twentieth of the volume. This is of particular importance in the case of serial investigations of small laboratory animals, such as white mice and rats. Finally, it is now possible also to carry out, in a short period of time and without preliminary steps, the determination of protein-bound triglycerides, for example, in human serum or in capillary plasma by means of previously prepared test combinations, which contain the necessary enzymes and adjuvants in optimum amount and possibly in buffered and stabilized solution.

The pre-pared test combinations are preferably mixed with stabilizing adjuvants in order to permit comparatively long storage times of the labile enzyme mixture and in order to provide a stable commercial form of use in laboratories and in medical practice.

A test combination which has proved to be especially advantageous contains a definite volume of a buffered, aqueous solution of a measured amount of adenosine triphosphate, which is stabilized, for example, by the addition of trishydroxymethylaminomethane or of an alkali metal azide, and, separately therefrom, a powder mixture, preferably in tablet form, which contains NADH and sodium phosphoenolpyruvate in measured amounts. Since powder mixtures and tablets in the described form are not storage-stable, there can be added a neutral amino acid, for example, glycine, and advantageously an alkali metal salt of a strong acid, for example, potassium chloride, to provide stabilization.

For carrying out the test reaction, the powder mixture or the tablet is added to the above-described adenosine triphosphate solution. After mixing with the tri-, di- or monoglyceride-containing sample, the preliminary reaction is initiated with an enzyme mixture which contains lactate dehydrogenase, pyruvate kinase and glycerokinase. After the preliminary reaction has finished, the first extinction value is read off and the main reaction according to the present invention is commenced with *Rhizopus arrhizus* lipase. The difference between the first extinction value and the second extinction value, which can be read off after about 5 minutes, is directly proportional to the amount of glycerol liberated. Since, in the case of this process, only one pipetting step is needed, i.e. the addition of the sample, the test combination according to the present invention permits a further simplification and an increase of the accuracy of the quantitative determination of mono-, di- and tri-glycerides.

The highly purified lipase from *Rhizopus arrhizus* (var. Delemar) used according to the present invention shows, with regard to olive oil, at the pH optima of 3.5 and 7.0, activities of between 3500 and 7000 u./mg. The purity of the Rhizopus lipase was tested electrophoretically.

The process according to the present invention for the quantitative enzymatic fission of lipoprotein-bound tri-, di- and monoglycerides, optionally together with proten-free neutral fats, is, therefore, characterized in that, as enzyme, there is used a lipase obtained from *Rhizopus arrhizus*.

A specific test combination for the completely enzymatic determination of lipoproteins and/or protein-free netural fats in body fluids, contains as active reagents:

(1) phosphoenol pyruvate
(2) adenosine triphosphate
(3) lipase
(4) lactate dehydrogenase
(5) pyruvate kinase
(6) glycerokinase and
(7) nicotinamide-adenine-dinucleotide in reduced form, is also characterized in that the lipase contained in the test combination has been obtained from a culture of *Rhizopus arrhizus*.

In the test combinations according to the present invention, the adenosine triphosphate can be present in a buffered solution which can be stabilized, for example, with tris-hydroxymethylaminomethane or with an alkali metal azide. Furthermore, the phosphoenol pyruvate and the NADH can be present in solid form, for example, as a powder or pressed to form a table of definite weight, and can be stabilized with a neutral amino acid, for example, glycine, and optionally with an alkali metal salt of a strong acid, for example, potassium chloride.

The following examples are given for the purpose of illustrating the present invention, and are not to be construed as limitative thereof:

EXAMPLE 1

10 μl. of human serum were successively mixed with the following reagents:

1.5 ml. triethanolamine buffer (0.1 molar) adjusted to pH 7.6, containing NADH (0.12 mmole) and magnesium sulfate (0.74 mmole), 0.1 ml. sodium phosphoenol pyruvate (4.8 mmole) and adenosine triphosphate (1.3 mmole) dissolved in triethanolamine buffer (0.1 molar) adjusted to pH 7.6, 0.02 ml. lipase from *Rhizopus arrhizus* (4 mg./ml.) (3500 u./mg.=14,000 u./ml.), 0.005 ml. lactate dehydrogenase (900 u./ml.)/pyruvate kinase (150 u./ml.).

The solution thus prepared was, after 5 minutes, placed in a cuvette and the extinction determined at 366 nm. ($E_1$). By the addition of 0.005 ml. glycerokinase (85 u./ml.), the enzyme reaction, which finally leads via pyruvate, with decrease of NADH, to NAD, was initiated. After a further 10 minutes, the second extinction value was read off ($E_2$). From the extinction difference $\Delta E = E_1 - E_2$, there was obtained the triglyceride content according to the following equation $$\Delta E \times 4224 = \text{mg. percent triglyceride}$$

EXAMPLE 2

By means of the process described in Example 1, there were carried out 37 individual determinations of human serum, on the one hand, according to the conventional method (saponification with alcoholic potassium hydroxide solution) and, on the other hand, according to the present invention with the enzyme obtained from *Rhizopus arrhizus*. From the results obtained, there was obtained a correlation coefficient of $r=0.998$. The individual results obtained are set out in the following table:

TABLE

Triglyceride content of human serum samples in mg. percent

| (A) After saponification with alcoholic potassium hydroxide solution: | (B) After fission of the fat with lipase from *Rhizopus arrhizus*: |
|---|---|
| 417 | 416 |
| 160 | 145 |
| 445 | 430 |
| 472 | 460 |
| 135 | 110 |
| 608 | 621 |
| 1798 | 1925 |
| 1843 | 1710 |
| 108 | 105 |
| 124 | 133 |
| 350 | 305 |
| 492 | 445 |
| 1063 | 1020 |
| 126 | 149 |
| 160 | 154 |
| 400 | 372 |
| 129 | 132 |
| 72 | 74 |
| 268 | 250 |
| 72 | 74 |

TABLE—Continued

| (A) After saponification with alcoholic potassium hydroxide solution: | (B) After fission of the fat with lipase from *Rhizopus arrhizus*: |
|---|---|
| 177 | 167 |
| 375 | 355 |
| 167 | 149 |
| 65 | 57 |
| 154 | 145 |
| 189 | 189 |
| 232 | 215 |
| 63 | 65 |
| 165 | 159 |
| 110 | 116 |
| 365 | 362 |
| 214 | 198 |
| 462 | 456 |
| 90 | 89 |
| 438 | 410 |
| 194 | 188 |
| 70 | 72 |

EXAMPLE 3

2.5 ml. of an aqueous buffer solution containing:

65 mg. triethanolamine hydrochloride
25 mg. tris-hydroxymethylaminomethane
1.25 mg. adenosine triphosphate disodium salt
1.25 mg. magnesium sulphate heptahydrate were mixed with a tablet which contains:

4.5 mg. NADH
6.0 mg. sodium phosphoenol pyruvate
58.8 mg. glycine
14.8 mg. potassium chloride, and
4.4 mg. polywax 6000 (Deutsches Arzneibuch 7)

After the tablet had dissolved, the working solution thus prepared was placed in a cuvette and mixed with 20 μl. serum, as well as with
about 30 μl. enzyme mixture, consisting of lactate dehydrogenase, pyruvate kinase and glycerokinase.

After the preliminary reaction had finished, the extinction was measured and the mixture was then mixed with 20 μl. lipase from *Rhizopus arrhizus*, whereafter the triglyceride content was calculated from the second extinction value in the manner described in Example 1.

It will be understood that the specification and examples are illustrative but not limitative of the present invention and that other embodiments within the spirit and scope of the invention will suggest themselves to those skilled in the art.

We claim:

1. Method for the quantitative enzymatic determination of lipoprotein-bound tri- di- and monoglycerides which comprises using as the enzyme a lipase obtained from *Rhizopus arrhizus*, converting the glycerol obtained as a cleavage product to pyruvate, converting the pyruvate to lactic acid with NADH, and determining the amount of NADH used up photometrically as a measure of the initial glyceride content.

2. Process as claimed in claim 1 wherein said glycerides are in the presence of protein-free neutral fats which fats are also split enzymatically.

3. Method for the quantitive enzymatic determination of protein-free neutral fats in solution which comprises using as the enzyme a lipase obtained from *Rhizopus arrhizus*, converting the glycerol obtained as a cleavage product to pyruvate, converting the pyruvate to lactic acid with NADH, and determining the amount of NADH used up photometrically as a measure of the initial glyceride content.

4. Test composition for the fully enzymatic determination of lipoproteins and protein-free neutral fats in body fluids which composition contains, as active ingredients phosphoenol pyruvate
adenosine triphosphate
lactate dehydrogenase
pyruvate kinase
glycerokinase
nicotinamide-adenine-dinucleotide in the reduced form; and
lipase obtained from a culture of *Rhizopus arrhizus*.

5. Composition as claimed in claim 4 wherein said composition is pressed into a tablet in dosage unit.

6. Composition as claimed in claim 4 wherein said adenosine triphosphate is present in the form of a buffered solution stabilized with tris-hydroxymethylaminomethane.

7. Composition as claimed in claim 4 wherein said adenosine triphosphate is present in the form of a buffered solution stabilized with an alkali metal azide.

8. Composition as claimed in claim 4 wherein said phosphoenol pyruvate is present, together with nicotinamide-adenine-dinucleotide, as a solid mixture stabilized with a neutral amino acid.

9. Composition as claimed in claim 8 wherein said amino acid is glycine.

10. Composition as claimed in claim 8 wherein said mixture is additionally stabilized with an alkali metal salt of a strong acid.

11. Composition as claimed in claim 10 wherein said salt is potassium chloride.

References Cited

UNITED STATES PATENTS

| 3,262,863 | 7/1966 | Fukumoto et al. | 195—66 |
| 3,703,591 | 11/1972 | Bucolo et al. | 195—103.5 R |

OTHER REFERENCES

Chemical Abstracts; vol. 70, 1969, 424m.

George Guilbault, Enzymatic Methods of Analysis, 1st ed., publishers—Pergamon Press Inc., pp. 159, 187 and 193 (1970).

H. U. Bergmeyer, Methods of Enzymatic Analysis, 2d ed., publishers—Academic Press, pp. 211 and 1006 (1965).

A. LOUIS MONACELL, Primary Examiner

R. J. WARDEN, Assistant Examiner

U.S. Cl. X.R.

195—99

UNITED STATES PATENT OFFICE
CERTIFICATE OF CORRECTION

Patent No. 3,759,793      Dated September 18, 1973

Inventor(s) Harald Stork et al

It is certified that error appears in the above-identified patent and that said Letters Patent are hereby corrected as shown below:

Col. 3, line 11,

For      "pre-pared"

Read      -- pre-prepared --

Col. 3, line 50,

For      "7000"

Read      -- 8000 --

Signed and sealed this 4th day of June 1974.

(SEAL)
Attest:

EDWARD M. FLETCHER, JR.
Attesting Officer

C. MARSHALL DANN
Commissioner of Patents